(12) United States Patent
Friday et al.

(10) Patent No.: US 12,382,368 B2
(45) Date of Patent: Aug. 5, 2025

(54) WIRELESS ACCESS POINT PROXIMITY ZONES

(71) Applicant: Juniper Networks, Inc., Sunnyvale, CA (US)

(72) Inventors: Kevin Friday, Los Gatos, CA (US); Randall Frei, San Jose, CA (US); Nagarjun Srinivasan, Sunnyvale, CA (US); Sunalini Sankhavaram, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 390 days.

(21) Appl. No.: 17/644,984

(22) Filed: Dec. 17, 2021

(65) Prior Publication Data

US 2023/0047635 A1    Feb. 16, 2023

Related U.S. Application Data

(60) Provisional application No. 63/233,135, filed on Aug. 13, 2021.

(51) Int. Cl.
*H04W 48/08* (2009.01)
*H04B 17/318* (2015.01)
(Continued)

(52) U.S. Cl.
CPC .......... *H04W 48/08* (2013.01); *H04B 17/318* (2015.01); *H04W 4/023* (2013.01); *H04W 48/16* (2013.01)

(58) Field of Classification Search
None
See application file for complete search history.

(56) References Cited

U.S. PATENT DOCUMENTS

| 7,787,887 B2 | 8/2010 | Gupta et al. |
| 8,626,187 B2 | 1/2014 | Grosman et al. |

(Continued)

FOREIGN PATENT DOCUMENTS

| EP | 3799475 A1 | 3/2021 |
| WO | 2013013255 A1 | 1/2013 |
| WO | 2016055970 A2 | 4/2016 |

OTHER PUBLICATIONS

Extended Search Report from counterpart European Application No. 22190035.0 dated Jan. 2, 2023, 11 pp.

(Continued)

*Primary Examiner* — German Viana Di Prisco
(74) *Attorney, Agent, or Firm* — Shumaker & Sieffert, P.A.

(57) ABSTRACT

Techniques are described by which a network management system (NMS) is configured to generate and monitor an RSSI-based proximity zone for a wireless network using a user interface (UI). The NMS may generate a UI comprising UI elements representing access point (AP) devices configured to provide a wireless network at a site; receive, at the user interface, an indication of a user input selecting one or more UI elements representing selected AP devices; establish a proximity zone for each of the selected AP devices based on an RSSI threshold value; receive network data comprising proximity information of a client device relative to the selected AP devices; generate, based on proximity assessments using the proximity information and the RSSI threshold value of the proximity zone, one or more proximity events indicating the client device relation to the proximity zone; and invoke, based on the proximity events, one or more actions.

18 Claims, 13 Drawing Sheets

(51) Int. Cl.
*H04W 4/02* (2018.01)
*H04W 48/16* (2009.01)

(56) References Cited

U.S. PATENT DOCUMENTS

| | | | |
|---|---|---|---|
| 8,750,895 | B2 | 6/2014 | Grosman et al. |
| 9,019,984 | B2 | 4/2015 | Grosman et al. |
| 9,729,439 | B2 | 8/2017 | MeLampy et al. |
| 9,729,682 | B2 | 8/2017 | Kumar et al. |
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,912,765 | B2 | 3/2018 | Theobald et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 10,756,983 | B2 | 8/2020 | Ratkovic et al. |
| 10,813,072 | B1* | 10/2020 | Reyes ............... H04W 4/029 |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 2005/0130668 | A1* | 6/2005 | Cameron ............ H04W 64/00 455/456.1 |
| 2009/0092113 | A1* | 4/2009 | Doshi ............... H04W 24/04 370/338 |
| 2014/0064116 | A1 | 3/2014 | Linde et al. |
| 2015/0339091 | A1* | 11/2015 | Yamaguchi ......... G06F 3/147 345/2.1 |
| 2017/0061490 | A1* | 3/2017 | Ghahremani ...... G06Q 30/0277 |
| 2017/0289814 | A1 | 10/2017 | Kaushik et al. |
| 2018/0014161 | A1 | 1/2018 | Warren et al. |
| 2020/0053511 | A1* | 2/2020 | Yamazaki ......... H04W 4/029 |
| 2020/0403890 | A1 | 12/2020 | McCulley et al. |
| 2021/0306201 | A1 | 9/2021 | Wang et al. |

OTHER PUBLICATIONS

Response to Extended Search Report dated Jan. 2, 2023, from counterpart European Application No. 22190035.0 filed Aug. 11, 2023, 25 pp.

Sheth et al. "Geo-fencing: Confining Wi-Fi Coverage to Physical Boundaries" In: Tokuda H., Beigl M., Friday A., Brush A.J.B., Tobe Y. (eds) Pervasive Computing. Pervasive 2009. Lecture Notes in Computer Science, vol. 5538. Springer, Berlin, Heidelberg, 17 pp.

U.S. Appl. No. 17/303,222, filed May 24, 2021 entitled "Virtual Network Assistant Having Proactive Analytics and Correlation Engine Using Unsupervised ML Model" (inventor Safavi), Juniper Networks, Inc.

Notice of Intent to Grant and Text Intended to Grant from counterpart European Application No. 22190035.0 dated Jun. 3, 2025, 63 pp.

\* cited by examiner

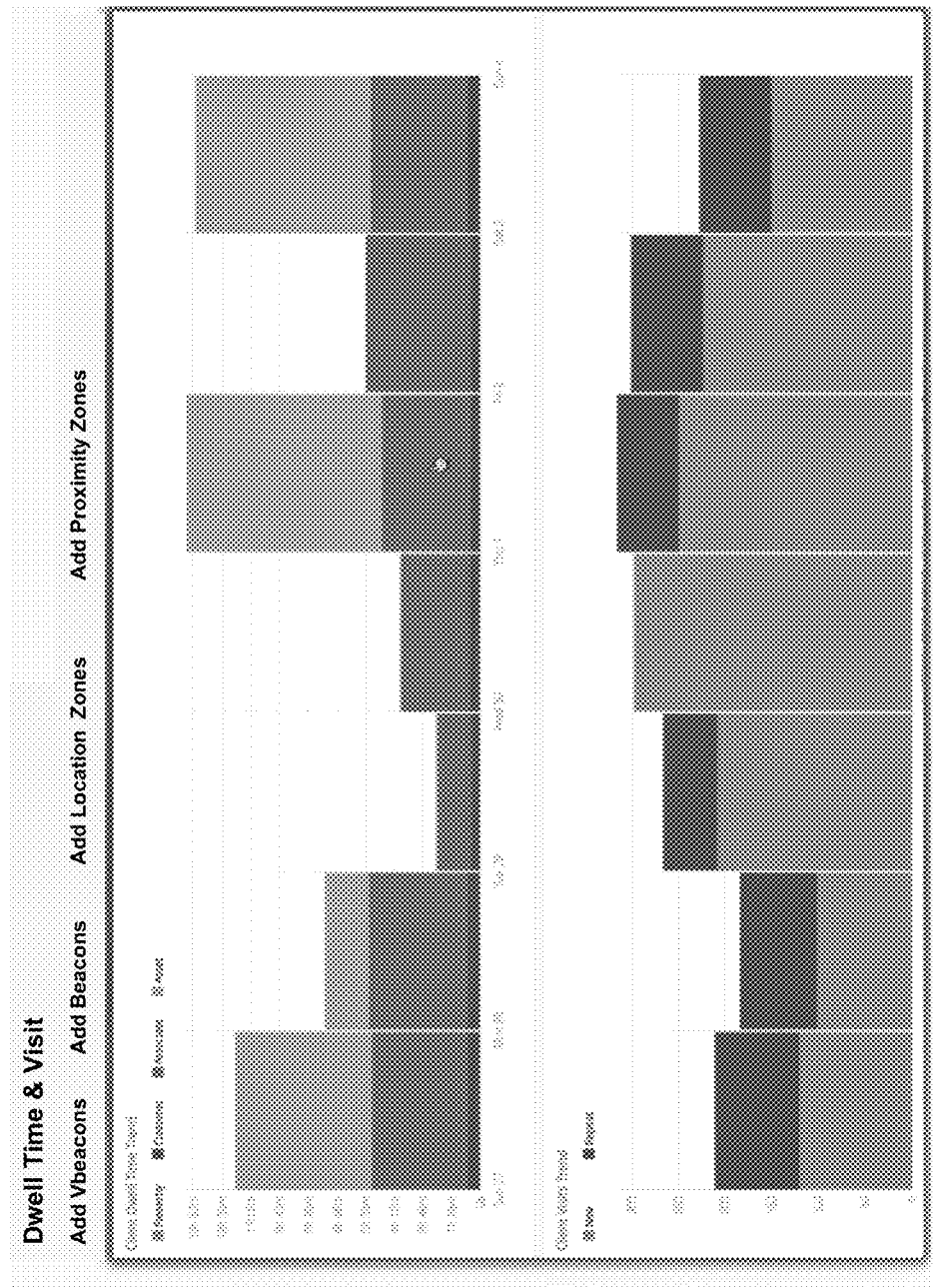

WIRELESS ACCESS POINT PROXIMITY ZONES

This application claims the benefit of U.S. Provisional Application No. 63/233,135, filed Aug. 13, 2021, the entire content of which is herein incorporated by reference in its entirety.

TECHNICAL FIELD

The disclosure relates generally to computer networks and, more specifically, to generating and monitoring of wireless network proximity zones.

BACKGROUND

Commercial premises, such as offices, hospitals, airports, stadiums, or retail outlets, often include a network of wireless access points (APs) installed throughout the premises to provide wireless network services to one or more wireless devices. APs enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Monitoring entry and/or exit of a wireless device into or out of predefined zone(s) at the premises in order to provide occupancy data and/or location-based services to client devices within the zone(s) is useful in a variety of applications. In outdoor environments, so-called geofences can be set up to monitor wireless device location via global positioning system (GPS) technologies. However, indoor environments are not generally amenable to location determination via GPS. Therefore, a variety of other techniques have been developed to locate a wireless device when the wireless device is located indoors. Typically, these rely on path loss measurements, triangulation, signal strength lateration, and other computationally intensive techniques.

SUMMARY

In general, this disclosure describes techniques for generating and monitoring RSSI-based proximity zones in a wireless network using a user interface. For example, a site, such as a site for an enterprise, may include a plurality of access point (AP) devices configured to provide one or more wireless networks for client devices. A network management system (NMS) may manage the plurality of AP devices, such as by establishing proximity zones for one or more of the plurality of AP devices to determine the proximity of client devices relative to established proximity zones.

For example, the NMS generates data representative of a user interface (UI) for display on a display device, the data representative of the UI comprising user interface elements representing the plurality of AP devices of a site for which to manage and monitor AP proximity zones. Typically, a user may use the NMS to generate location-based proximity zones, which is a time-consuming process necessitating a user to manually draw or otherwise specify, via the user interface on the display device, the boundaries (e.g., X-Y coordinates) of the proximity zone. In accordance with the techniques described in this disclosure, the NMS may provide a user interface including user interface elements to enable a user to establish a proximity zone for one or more AP devices based on a received signal strength indicator (RSSI) threshold value. For example, the NMS may receive, via the user interface on the display device, an indication of a user input selecting one or more AP devices for which to generate proximity zones. The NMS establishes a proximity zone for each of the selected AP devices based on an RSSI threshold value. In some examples, the RSSI threshold value is specified by user input (e.g., on a slider UI element or input field within the user interface) to control the size of the proximity zone for the respective selected AP device.

The NMS may then monitor the established proximity zones. For example, the NMS receives network data comprising proximity information of a client device relative to the selected AP devices. For example, an AP device with an established proximity zone may detect a client device is within range of its wireless signal and sends network data including proximity information of the client device relative to the AP device. The proximity information may include, for example, an identifier of the client device, an identifier of the AP device, and an RSSI value of the client device. In response to receiving the network data, the NMS performs one or more assessments of the client device relative to the proximity zone (referred to herein as "proximity assessments"). For example, the NMS may compare the RSSI threshold value for the proximity zone with the RSSI value of the client device, and based on that determination, generates one or more proximity events, such as an indication of whether the client device has entered the proximity zone, exited the proximity zone, is inside the proximity zone, is outside the proximity zone, etc. The proximity events may invoke one or more actions to be performed (e.g., send alert notifications, generate density maps, control third-party devices, etc.).

The techniques of the disclosure may provide one or more technical advantages and practical applications. For example, by providing a user interface by which a user may set up proximity zones based on an RSSI threshold value rather than location-based proximity zones, a user may quickly establish and adjust the size of the proximity zones without manually drawing or otherwise manually defining detailed boundaries (e.g., X-Y coordinates) of location-based proximity zones, which may be time-consuming. Moreover, RSSI-based proximity zones may generate proximity events and invoke resulting actions faster than location-based proximity zones. For example, location-based proximity zones require processing more data to map the location of client devices relative to the location-based proximity zones (e.g., mapping X-Y coordinates of a client device to the X-Y coordinates of the proximity zone). In contrast, RSSI-based proximity zones compare the RSSI value of the client device to the RSSI threshold value of the proximity zone to generate proximity events, which processes less data and results in faster response time for triggering actions.

In one example, the disclosure is directed to a network management system comprising: one or more processors; and a memory comprising instructions that when executed by the one or more processors cause the one or more processors to: generate data representative of a user interface (UI) for display on a display device, the data representative of the UI comprising UI elements representing a plurality of access point (AP) devices configured to provide a wireless network at a site; receive, via the user interface on the display device, an indication of a user input selecting one or more of the UI elements representing one or more selected AP devices of the plurality of AP devices; establish a proximity zone for each of the selected AP devices based on a received signal strength indicator (RSSI) threshold value; receive, from at least one of the selected AP devices, network data comprising proximity information of a client device relative to the at least one of the selected AP devices; generate, based on one or more proximity assessments using the proximity information and the RSSI threshold value of the proximity zone for the at least one of the selected AP devices, one or more proximity events indicating the client device relation to the proximity zone; and invoke, based on the one or more proximity events, one or more actions.

In one example, the disclosure is directed to a method comprising: generating, by one or more processors of a network management system, data representative of a user interface (UI) for display on a display device, the data representative of the UI comprising UI elements representing a plurality of access point (AP) devices configured to provide a wireless network at a site; receiving, via the user interface on the display device, an indication of a user input selecting one or more of the UI elements representing one or more selected AP devices of the plurality of AP devices; establishing, by the network management system, a proximity zone for each of the selected AP devices based on a received signal strength indicator (RSSI) threshold value; receiving, by the network management system and from at least one of the selected AP devices, network data comprising information of a client device relative to the at least one of the selected AP devices; generating, by the network management system and based on one or more proximity assessments using the proximity information and the RSSI threshold value of the proximity zone for the at least one of the selected AP devices, one or more proximity events indicating the client device relation to the proximity zone; and invoking, by the network management system and based on the one or more proximity events, one or more actions.

In one example, the disclosure is directed to a non-transitory computer-readable storage medium comprising instructions that, when executed, configure processing circuitry to: generate data representative of a user interface (UI) for display on a display device, the data representative of the UI comprising UI elements representing a plurality of access point (AP) devices configured to provide a wireless network at a site; receive, via the user interface on the display device, an indication of a user input selecting one or more of the UI elements representing one or more selected AP devices of the plurality of AP devices; establish a proximity zone for each of the selected AP devices based on a received signal strength indicator (RSSI) threshold value; receive, from at least one of the selected AP devices, network data comprising information of a client device relative to the at least one of the selected AP devices; generate, based on one or more proximity assessments using the proximity information and the RSSI threshold value of the proximity zone for the at least one of the selected AP devices, one or more proximity events indicating the client device relation to the proximity zone; and invoke, based on the one or more proximity events, one or more actions.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 8A and 8B illustrate examples of user interfaces including user interface elements representing an analysis by the network management system, in accordance with the techniques described in this disclosure.

DETAILED DESCRIPTION

Figure 1A:
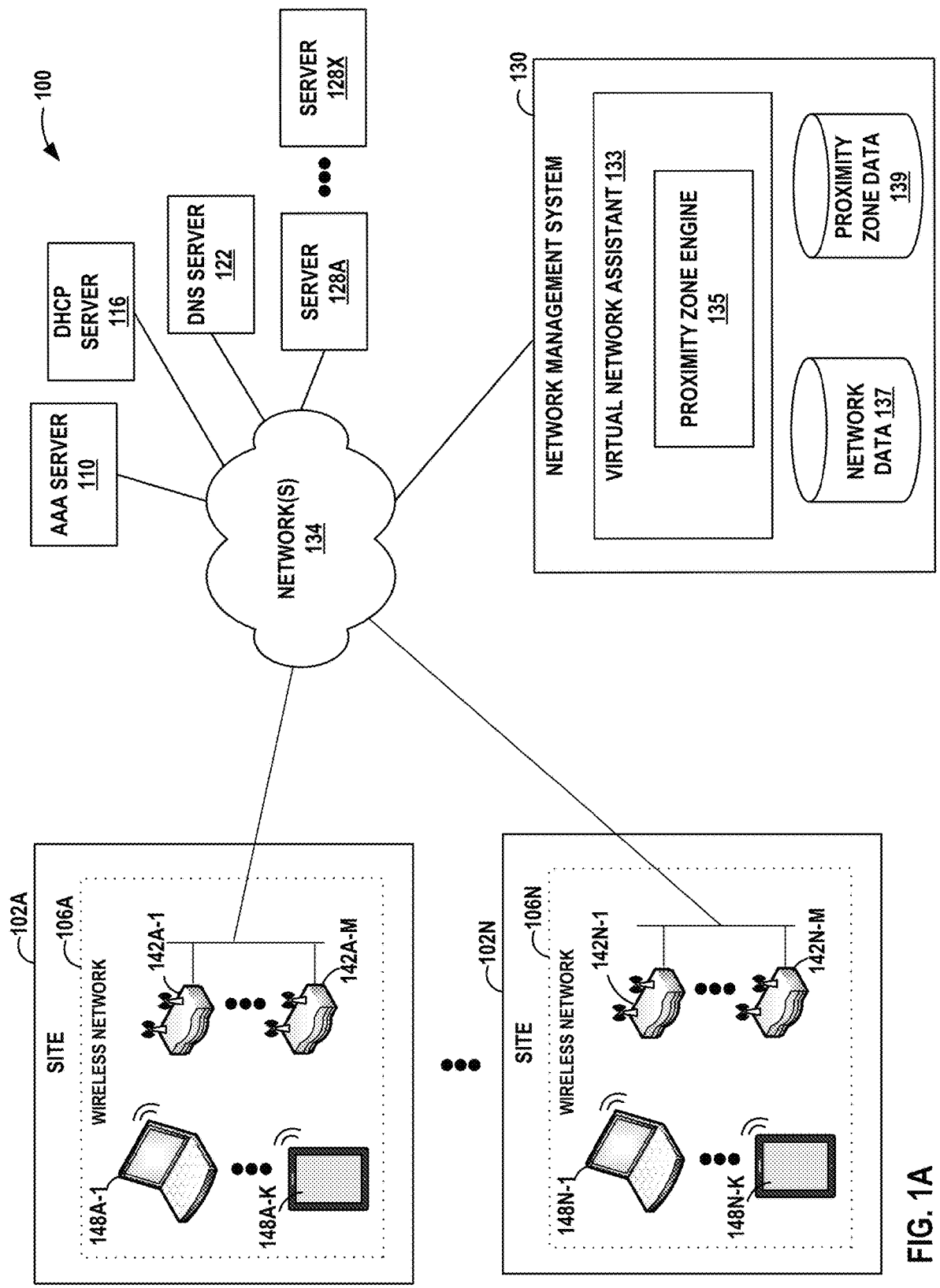
FIG. 1A is a block diagram of an example network system providing a user interface to generate and monitor RSSI-based proximity zones in a wireless network, in accordance with one or more techniques of the disclosure.

FIG. 1A is a diagram of an example network system 100 providing a user interface to generate and monitor RSSI-based proximity zones in a wireless network. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as enterprises, offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-N. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. For example, VNA 133 of NMS 130 may include a network performance engine that automatically determines one or more service level exception (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client device's received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor wireless network performance metrics detected or predicted from the streams of event data. VNA 160 may generate a notification indicative of the root cause and/or one or more remedial actions that may be taken to address the root cause of the error conditions or poor wireless network performance metrics. In some examples, if the root cause may be automatically resolved, VNA 160 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 160 may be part of the NMS 130, may execute on other servers or execution environments, or may be distributed to nodes within network 134 (e.g., routers, switches, controllers, gateways and the like). Example details of these and other operations implemented by the VNA 160 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with the techniques described in this disclosure, VNA 133 may include a proximity zone engine 135 to generate and monitor proximity zones for AP devices 142. Proximity zones are typically established to monitor the proximity of client devices in relation to the established proximity zone (e.g., whether client devices are entering, exiting, and/or remaining in the proximity zones), to generate events, and/or to invoke an action based on proximity of the client devices relative to the proximity zones.

As one example, NMS 130 may generate data representative of a user interface (UI) to generate and monitor proximity zones for AP devices 142. For example, NMS 130 may generate data representative of a UI including UI elements representing AP devices 142A-1 through 142A-M within site 102A. In some examples, AP devices 142A of site 102A may be located in different areas of site 102A, such as different organizations or different floors, sections, etc. In these examples, the user interface may include a mapping of each area, where the user interface for each area includes user interface elements representing the AP devices within a particular area.

To generate proximity zones for AP devices 142, proximity zone engine 135 of NMS 130 may generate data representative of a user interface that includes selectable user interface elements representing AP devices 142. The selectable user interface elements may include a selectable list of the AP devices 142, selectable user interface elements (e.g., icons) representing the AP devices 142 overlaid on the mapping of the site or area, or other user interface elements to enable a user to select one or more of the AP devices 142 for which to generate proximity zones.

Proximity zone engine 135 of NMS 130 may receive, via the user interface on the display device, an indication of a user input selecting one or more of AP devices 142 for which to generate a proximity zone. For example, a user may select one or more of AP devices 142 via the user interface and in response, proximity zone engine 135 may establish a proximity zone for each of the selected AP devices based on one or more RSSI threshold values. For example, proximity zone engine 135 may receive, via the user interface on the display device, an RSSI threshold value (e.g., decibel-milliwatt (dBm)) that corresponds to the size (e.g., distance in meters) of the proximity zone for a selected AP device. Proximity zone engine 135 may generate a user interface element, such as a text field, a slider UI element, or any user interface element to enable a user to input a particular RSSI threshold value. As one example implementation, the RSSI threshold value may be defaulted to −70 dBM, but may be specified as any RSSI value.

Using the one or more RSSI threshold values, proximity zone engine 135 generates a proximity zone for each of the selected AP devices. In some examples, each of the proximity zones for the selected AP devices are generated based on a single RSSI threshold value (e.g., proximity zones that are uniform in size). In other examples, proximity zones for the selected AP devices are generated using different RSSI threshold values (e.g., proximity zones that are non-uniform in size). In some examples, the individual proximity zones for a plurality of selected AP devices may be grouped to form a single proximity zone to monitor.

In some examples, proximity zone engine 135 may generate data representative of a proximity zone UI element overlaid on the UI mapping of the site or area that represents a visual representation of the proximity zone for a selected AP device. The proximity zone UI element may include a circle or any other shape that represents the RSSI-based proximity zone for an AP device.

Proximity zone engine 135 may monitor the one or more proximity zones established for the selected AP devices. Assume for example, a proximity zone is generated for AP device 142A-1 to detect the proximity of client devices 148 with respect to the proximity zone. In this example, AP device 142A-1 may detect client device 148A-1 is within range of the wireless signal of AP device 142A-1 and send, to NMS 130, network data including proximity information of client device 148A-1 relative to AP device 142A-1. In these examples, client device 148A-1 need not be connected to AP device 142A-1 to send proximity information of client device 148A-1 to NMS 130. The proximity information may include an identifier of client device 148A-1, an RSSI value of client device 148A-1, and/or an identifier for AP device 142A-1. NMS 130 receives the proximity information from AP device 142A-1 and forwards the proximity information to proximity zone engine 135. In some examples, client devices 148 (e.g., operating as a software development kit (SDK) client) may detect whether AP devices 142A are sending transmissions and send network data including proximity information to NMS 130.

Based on the proximity information and the RSSI threshold value of the proximity zone for AP device 142A-1, proximity zone engine 135 of NMS 130 determines the proximity of client device 148A-1 relative to the proximity zone for AP device 142A-1 (referred to herein as "proximity assessments"). For example, proximity zone engine 135 may compare the RSSI value of client device 148A-1 specified in the received network data and the RSSI threshold value of the proximity zone for AP device 142A-1, and based on the comparison (e.g., RSSI value of client greater/less than the RSSI threshold value of proximity zone), may generate events (referred to herein as "proximity events") to indicate the proximity of client device 148A-1 (e.g., inside, outside, etc.) relative to the proximity zone for AP device 142A-1.

As one example, proximity zone engine 135 may generate a proximity zone with an RSSI threshold value of −70 dBm. Proximity zone engine 135 may compare the RSSI value of client device 148A-1 with the RSSI threshold value. If proximity zone engine 135 determines that the RSSI value of client device 148A-1 (e.g., −60 dBm) is greater than or equal to the RSSI threshold value (e.g., −70 dBm) of the proximity zone, proximity zone engine 135 may generate an event (referred to herein as "in_event") to indicate the client device 148A-1 is within the proximity zone for AP device 142A-1. If proximity zone engine 135 determines that the RSSI value of client device 148A-1 (e.g., −75 dBm) is lower than the RSSI threshold value (e.g., −70 dBm) of the proximity zone, the client device 148A-1 may generate an event (referred to herein as "out event") to indicate client device 148A-1 is outside of the proximity zone for AP device 142A-1.

In some examples, proximity zone engine 135 may continuously monitor whether a client device 148A-1 is still within or no longer within the proximity zone of AP device 142A-1. In these examples, proximity zone engine 135 may receive subsequent proximity information associated with client device 148A-1 relative to AP device 142A-1 within a given duration and determine whether the RSSI value of subsequent proximity information of client device 148A-1 is still greater than or equal to the RSSI threshold value of the proximity zone for AP device 142A-1. If the RSSI value of subsequent proximity information of client device 148A-1 is still greater than or equal to the RSSI threshold value, proximity zone engine 135 may generate an event to indicate client device 148A-1 is still within the proximity zone (e.g., still in_event or another in_event with). If the RSSI value of subsequent proximity information of client device 148A-1 has changed to be less than or equal to the RSSI threshold value, proximity zone engine 135 may generate an event to indicate client device 148A-1 has exited the proximity zone (e.g., exit event or out event).

In some examples, if proximity zone engine 135 does not receive subsequent proximity information associated with client device 148A-1 relative to AP device 142A-1 within the given duration, proximity zone engine 135 may generate an event (e.g., out event) to indicate client device 148A-1 has exited the proximity zone.

In some examples, proximity zone engine 135 may determine how long the client device is (or was) within the proximity zone (i.e., dwell time). For example, proximity zone engine 135 may continuously receive proximity information associated with client device 148A-1 relative to AP device 142A-1 that are each timestamped. Proximity zone engine 135 may, in response to determining that the RSSI value of an initial proximity information and subsequent proximity information of client device 148A-1 is greater than or equal to the RSSI threshold value of the proximity zone for AP device 142A-1, compute the difference between the timestamps of the proximity information to determine the dwell time of a client device within a particular proximity zone.

In some examples, proximity zone engine 135 may include a timestamp with each generation of an event. In these examples, proximity zone engine 135 may, in response to determining that the RSSI value of an initial proximity information of client device 148A-1 is greater than or equal to the RSSI threshold value of the proximity zone for AP device 142A-1, generate a first in_event with a timestamp to indicate client device 148A-1 is entering or is inside the proximity zone. Proximity zone engine 135 may then, in response to determining that the RSSI value of a subsequent proximity information of client device 148A-1 is greater than or equal to the RSSI threshold value of the proximity zone for AP device 142A-1, generate a second in_event with a timestamp to indicate client device 148A-1 is inside the proximity zone. Proximity zone engine 135 may compute the difference between the timestamp of the first event and the timestamp of the second event to determine the dwell time of a client device within a particular proximity zone.

In some examples, proximity zone engine 135 may, in response to determining that the RSSI value of a subsequent proximity information of client device 148A-1 is less than the RSSI threshold value of the proximity zone for AP device 142A-1, generate an out event with a timestamp to indicate client device 148A-1 has exited the proximity zone. In these examples, proximity zone engine 135 may compute the difference between the timestamp of the first in_event and the timestamp of the out event to determine the dwell time of a client device within a particular proximity zone.

In some examples, proximity zone engine 135 may, based on the one or more proximity events, invoke an action such as sending a notification to a client device 148A-1 that is entering, exiting, inside, or outside the proximity zone for AP device 142A-1, generating occupant density UI map representing the density of client devices within the proximity zone, controlling devices within the proximity zone (e.g., disabling client device access to the wireless network, controlling automatic doors or other IoT devices, etc.), or any other action.

As one example implementation, proximity zone engine 135 may monitor the occupant density of a proximity zone and alert client devices if the proximity zone has exceeded the maximum occupancy level. For example, proximity zone engine 135 may maintain a count of the number of client devices within the proximity zone and may evaluate the number of client devices with a threshold value that indicates a maximum occupancy. If a client device enters the proximity zone and causes the number of client devices to exceed the maximum occupancy threshold value, proximity zone engine 135 may send a notification message (e.g., alert) to the client device entering the proximity zone (or client devices already within the proximity zone) that the proximity zone has exceeded the maximum occupancy level. More specifically, proximity zone engine 135 may maintain a count of the number of client devices inside the proximity zone by increasing the count with each in_event generated for client devices entering the proximity zone and decreasing the count with each out event generated for client devices exiting the proximity zone. Proximity zone engine 135 may compare the number of client devices inside the proximity zone with the maximum occupancy threshold value and in response to determining that the number of client devices inside the proximity zone has exceeded the maximum occupancy threshold value, invoke an action to send a notification to the client device entering the proximity zone (or client devices already within the proximity zone) that the proximity zone has exceeded the maximum occupancy level.

In some examples, proximity zone engine 135 may maintain a count of the number of client devices inside the proximity zone and generate data representative of a density UI map (e.g., heat map) representing the occupant density of client devices within a proximity zone. In these examples, the proximity zone engine 135 may generate data representative of a density UI map including one or more colors or any other characteristic (e.g., thickness, opaqueness, etc.) to indicate different densities of client devices within the proximity zone.

In some examples, proximity zone engine 135 may, in response to generating an in_event for a client device entering the proximity zone or out event for a client device exiting the proximity zone, control third-party devices within the proximity zone or site. For example, in response to detecting an unrecognized client device within a proximity zone, proximity zone engine 135 may control devices (e.g., IoT devices such as a lock) to prevent the user of the unrecognized client device from entering a prohibited area.

In some examples, proximity zone engine 135 may preserve proximity zones when AP devices are moved. For example, if an AP device is moved to a different area of a site, a previously generated proximity zone is maintained. For example, a proximity zone is initially generated for AP device 142A-1 located on a first floor of site 102A. If AP device 142A-1 is moved to a different floor of site 102A, the proximity zone for AP device 142A-1 is preserved such that a user need not redefine a proximity zone for AP device 142A-1.

Figure 1B:
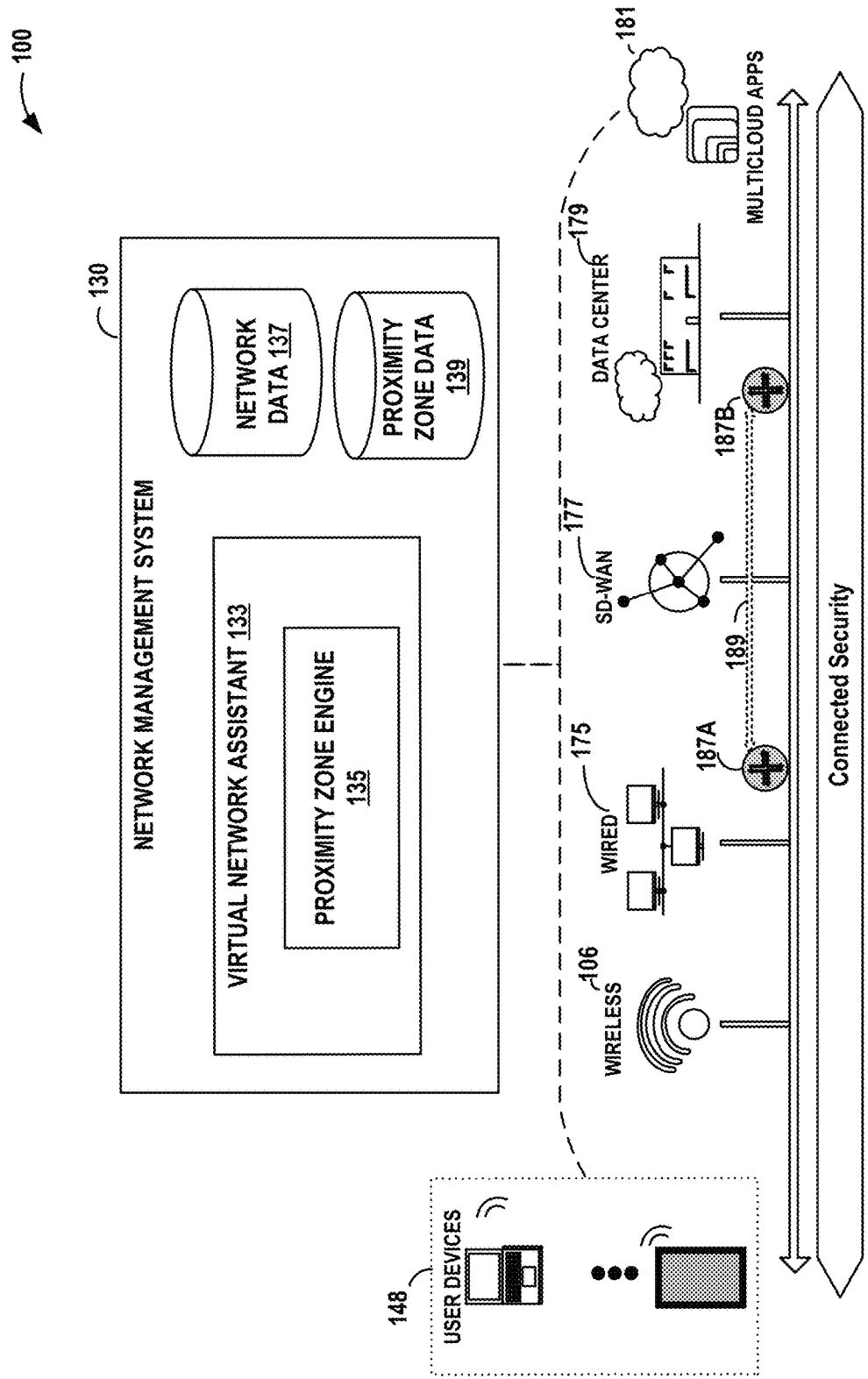
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
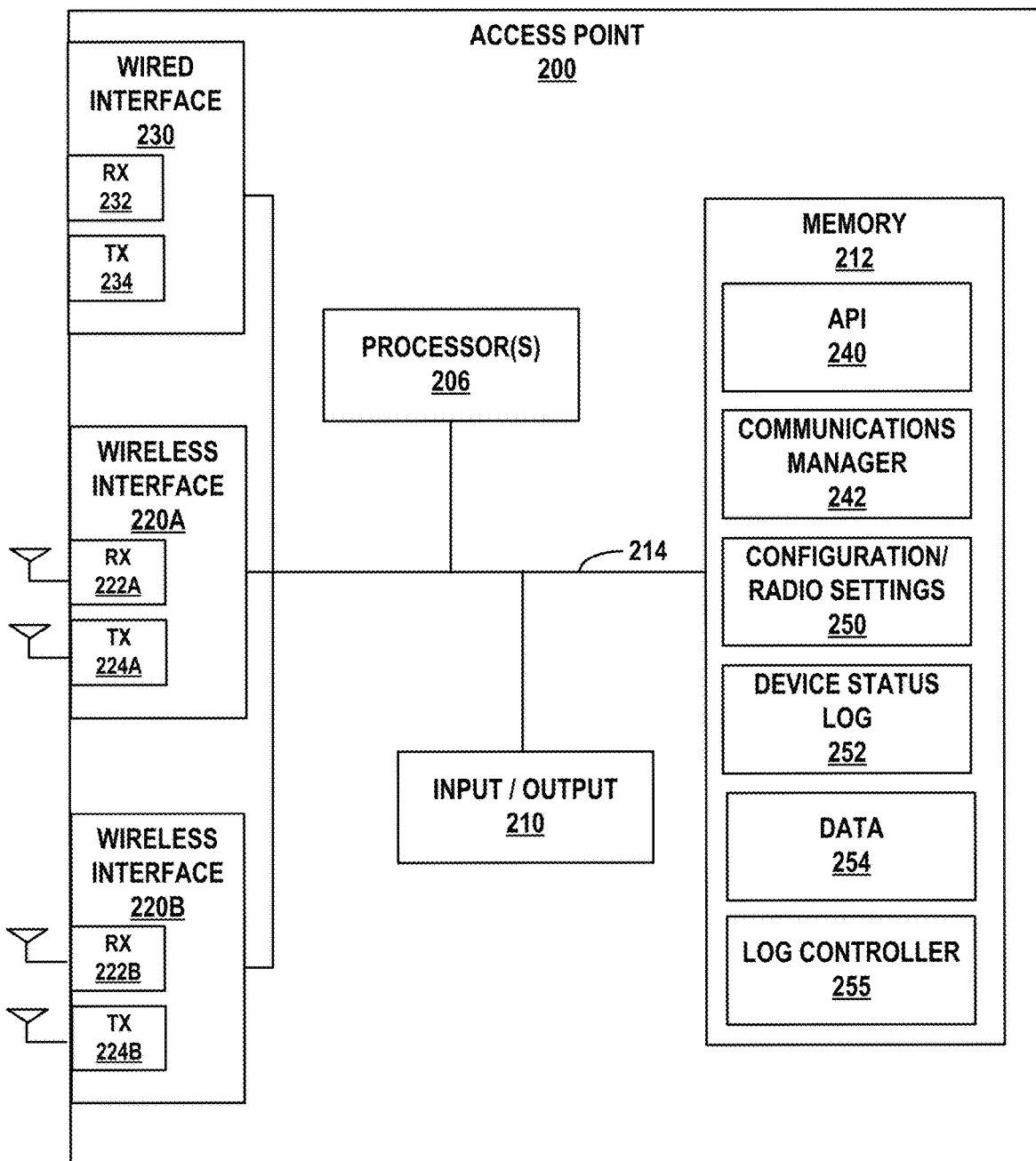
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data storage 254 may include, for example, AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, one or more types of proximity events, etc., as well as a time and date stamp for each event. Log controller 255 determines a logging level for the device based on instructions from NMS 130. Data 254 may store any data used and/or generated by access point device 200, including data collected from UEs 148, such as proximity information used to determine proximity of client devices relative to proximity zones of AP devices, that is transmitted by access point device 200 for cloud-based management of wireless networks 106A by NMS 130. For example, AP device 200 may detect a UE 148 is within range of its wireless signal and store proximity information associated with the UE 148 in data 254. For example, AP device 200 may store an identifier of UE 148 and the RSSI value of UE 148 in data 254. In some examples, AP device 200 may store an identifier for AP device 200 in data 254.

In response to detecting the UE 148, AP device 200 may send the proximity information to a network management system (such as NMS 130 of FIG. 1A). For example, the AP device 200 may send the client identifier of UE 148, RSSI value of UE 148, and/or the identifier of AP device 200. Based on the proximity information, the network management system may generate one or more proximity events and may, in response to the proximity events, invoke one or more actions, such as providing notifications to UE 148, and/or generating data representative of a user interface with a visual representation of analysis of the proximity events.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

In some examples, rather than the NMS 130 determining the one or more proximity assessments, AP 200 may be configured to determine the proximity assessments and/or automatically execute other functionality based on the proximity assessments.

Figure 3A:
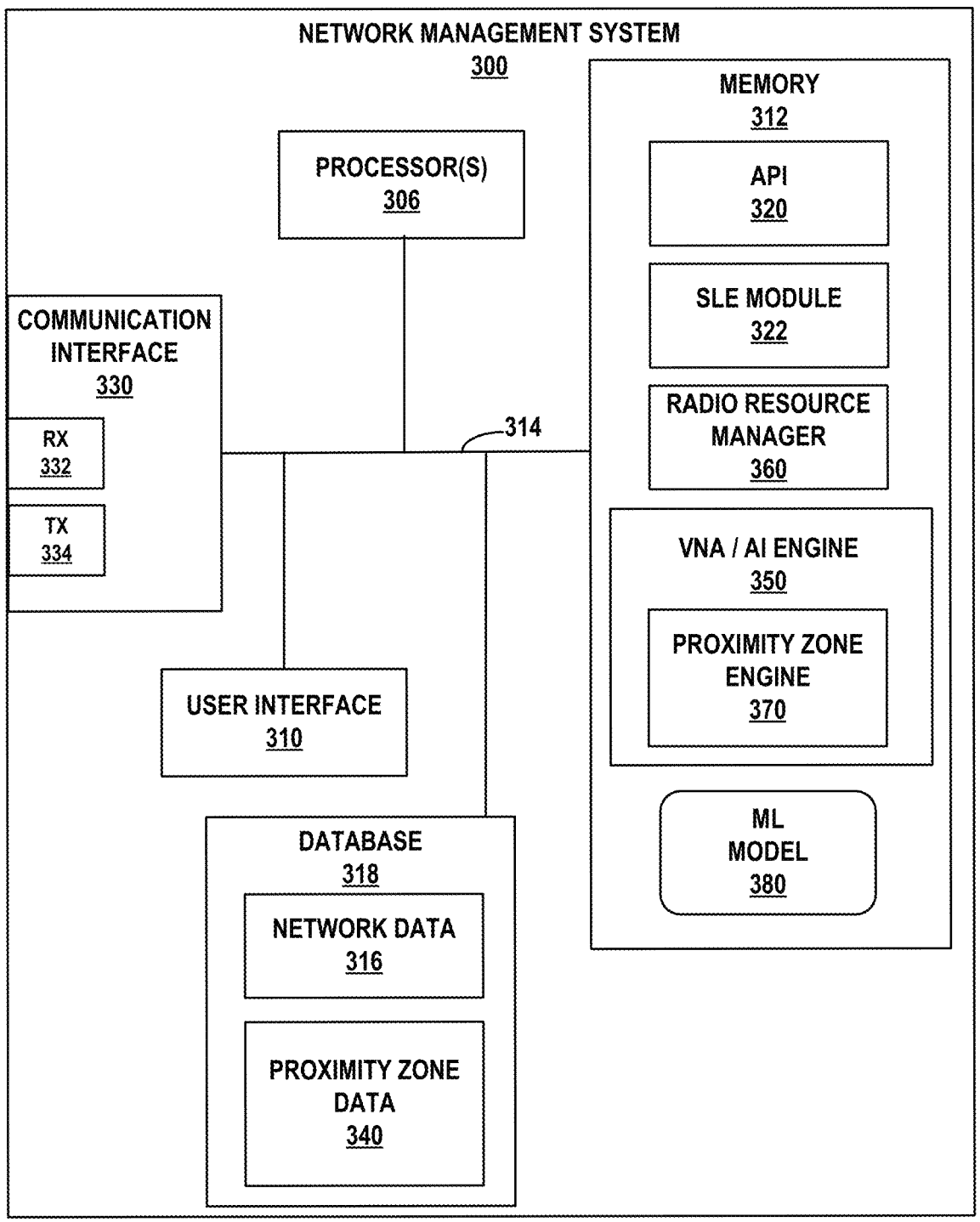
FIGS. 3A and 3B are a block diagrams of an example network management system configured to generate and monitor RSSI-based proximity zones in a wireless network, in accordance with one or more techniques of the disclosure.
Figure 3B:
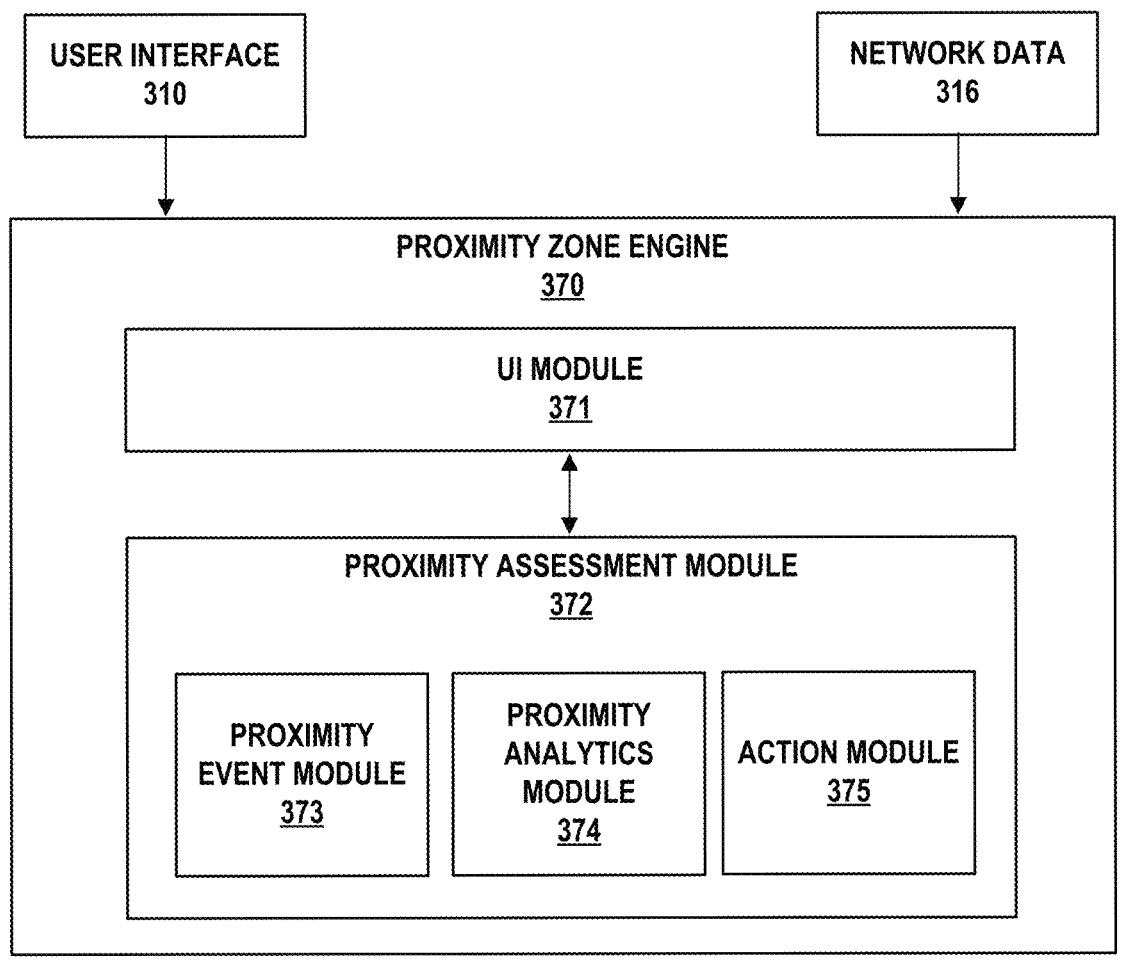

FIGS. 3A and 3B are block diagrams of an example network management system (NMS) 300 configured to generate and monitor RSSI-based proximity zones for AP devices using a user interface, in accordance with one or more techniques of the disclosure. NMS 300 may be used to implement, for example, NMS 130 in FIG. 1A. In such examples, NMS 300 is responsible for monitoring and management of one or more wireless networks 106A-106N at sites 102A-102N, respectively. In some examples, NMS 300 receives network data collected by AP devices 142 from UEs 148, such as network data including proximity information used to determine one or more proximity assessments, and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIG. 1A. The data and information received by NMS 300 may include, for example, network data and/or event log data received from access points 142 used by NMS 300 to remotely monitor and/or control the performance of wireless networks 106A-106N. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, and a machine learning model 380. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 106A-106N in order to learn and optimize the radio-frequency (RF) environment at each site. For example, RRM engine 360 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may measure the strength of a radio signal of client devices, such as an RSSI value. RRM engine 360 may further automatically change or update configurations of one or more AP devices 142 at a site 106 with an aim to improve the coverage and/or capacity SLE metrics and thus to provide an improved wireless experience for the user.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. VNA/AI engine 350 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 350 may automatically invoke one or more remedial actions intended to address the identified root cause(s) of one or more poor SLE metrics. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

SLE module 322 enables set up and tracking of thresholds for one or more SLE metrics for each of wireless networks 106A-106N. SLE module 322 further analyzes network data (e.g., stored as network data 316) collected by AP devices and/or UEs associated with wireless networks 106A-106N, such as any of AP devices 142 from UEs 148 in each wireless network 106A-106N. For example, AP devices 142A-1 through 142A-M collect network data from UEs 148A-1 through 148A-K currently associated with wireless network 106A (e.g., named assets, connected/unconnected WiFi clients). This data, in addition to any network data collected by one or more APs 142A-1 through 142A-M in wireless network 106A, is transmitted to NMS 300 and stored as, for example, network data 316.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

In accordance with the techniques described in this disclosure, VNA engine 350 includes a proximity zone engine 370. Proximity zone engine 370 may represent an example implementation of proximity zone engine 135 of FIG. 1A. A more detailed view of proximity zone engine 370 is described and illustrated in FIG. 3B.

In the example of FIG. 3B, proximity zone engine 370 may include UI module 371 and proximity assessment module 372. Although UI module 371 is illustrated as included in proximity zone engine 370, UI module may be a separate module within NMS 300 accessible by proximity zone engine 370.

UI module 371 may generate data representative of a user interface including selectable user interface elements representing AP devices 142 for which to generate proximity zones. The selectable user interface elements may include a selectable list of the AP devices 142, selectable user interface elements (e.g., icons) representing the AP devices 142 overlaid on the mapping of the site or area, or other user interface elements to enable a user to select one or more of the AP devices 142 for which to generate the proximity zones.

Proximity zone engine 370 of NMS 300 may receive, at user interface 310, an indication of a user input selecting UI elements representing one or more of AP devices 142 for which to generate a proximity zone. For example, a user may provide a selection of the UI elements representing one or more of AP devices 142 via user interface 310. Information identifying the selected AP devices may be stored in database 318, e.g., in proximity zone data 340, or within proximity zone engine 370. In response to receiving the user input selecting one or more AP devices 142, proximity zone engine 370 may establish a proximity zone for each of the selected AP devices (or a group of selected AP devices) based on one or more RSSI threshold values.

In some examples, UI module 371 may generate data representative of a user interface element to receive, at user interface 310, an RSSI threshold value (e.g., decibel-milliwatt (dBm)) that represents the size of the proximity zone for the selected one or more AP devices 142. The size of the proximity zone may correspond to the distance (e.g., meters) of the proximity zone. For example, UI module 371 may generate within user interface 310 an input field (e.g., text field), a slider UI element, or any UI element to specify an RSSI threshold value via user interface 310. The RSSI threshold value may be stored in database 318, e.g., in proximity zone data 340, or within proximity zone engine 370.

Using the one or more RSSI threshold values, proximity zone engine 370 establishes a proximity zone for the selected AP devices. In some examples, a proximity zone is generated for each of the selected AP devices using a single RSSI threshold value (e.g., proximity zones that are uniform in size). In other examples, proximity zones are generated for the selected AP devices using different RSSI threshold values (e.g., proximity zones that are non-uniform in size). In these examples, proximity zone engine 370 may assign an identifier (e.g., name) and RSSI threshold value associated with each proximity zone of the selected AP devices and store the identifier and RSSI threshold value in proximity zone data 340.

In some examples, a plurality of selected AP devices may be grouped to form a single proximity zone. In these examples, proximity zone engine 370 may assign a group identifier (e.g., name) and one or more RSSI threshold values associated with a group of selected AP devices of the group of selected AP devices and store the group identifier and one or more RSSI threshold values in proximity zone data 340.

In some examples, UI module 371 may generate data representative of a proximity zone UI element overlaid on the UI mapping of the site or area that represents a proximity zone for a selected AP device. As one example, proximity zone engine 370 may cause UI module 371 to generate data representative of a circle or any other shape over an AP device UI element of the selected AP device 142 that represents the proximity zone for the selected AP device. The size of the proximity zone UI element may correspond to the RSSI threshold value specified for the proximity zone. For example, a proximity zone UI element for an RSSI threshold value of −83 dBm may be larger than a proximity zone UI element for an RSSI threshold value of −60 dBm.

In some examples, proximity zone engine 370 may cause UI module 371 to generate data representative of an input field to enable a user to specify a name for the proximity zone or a group of proximity zones, or may by default name the proximity zone using the name of the selected AP device.

Proximity zone engine 370 includes a proximity assessment module 372 to monitor the proximity zones established for the selected AP devices. Proximity assessment module 372 may include proximity event module 373, proximity duration module 374, and action module 375. Proximity assessment module 372 may include some or all of these modules, and may also include other modules for assessment of proximity zones.

Proximity zone engine 370 may obtain proximity information from network data 316 (or receive proximity information directly from communication interface 330 of FIG. 3A) and may forward network data 316 to proximity assessment module 372. Proximity event module 373 may compare an RSSI value of a client device (determined from the client identifier and RSSI value in the proximity information) with an RSSI threshold value of a proximity zone of an AP device (determined from a lookup of the proximity zone data 340 using the AP device identifier in the proximity information). For example, proximity event module 373 may include a computation engine (not shown) to perform an inequality computation on the RSSI value of the client device and the RSSI threshold value of the proximity zone. In response to the comparison, proximity event module 373 may generate a proximity event. For example, if proximity event module 373 determines that the RSSI value of the client device is greater than or equal to the RSSI threshold value of the proximity zone, proximity event module 373 generates an event (in_event) to indicate the client device is in the proximity zone. Alternatively, or additionally, if proximity event module 373 determines that the RSSI value of the client device is less than the RSSI threshold value of the proximity zone, proximity event module 373 generates an event (out event) to indicate the client device is not in the proximity zone.

In some examples, proximity event module 373 may generate an event for a proximity zone established for a group of AP devices. For example, a particular room (e.g., break room of a site) may have a plurality of AP devices. Proximity event module 373 may generate an event when a client device is determined to be within any of the proximity zones of the group of AP devices.

In some examples, proximity assessment module 372 includes a proximity analytics module 374 to analyze the generated proximity events. For example, proximity analytics module 374 may determine the dwell time of a client device within a proximity zone, count the number of visits by a client device to a proximity zone, and/or the wait time of the client device. In these examples, proximity zone engine 370 may receive subsequent proximity information associated with a client device relative to an AP device and proximity analytics module 374 may analyze a historical log of the generated events.

For example, to determine dwell time of a client device within a proximity zone, proximity analytics module 374 may receive subsequent proximity information associated with a client device relative to a proximity zone of an AP device. In some examples, the proximity information obtained from network date 316 may include a timestamp of when the proximity information was received by NMS 300. In some examples, proximity event module 373 may generate an event with a timestamp. In any event, proximity analytics module 374 may determine from the timestamps whether a client device is still in the proximity zone or is no longer in the proximity zone. For example, in response to receiving a subsequent in_event that indicates the client is still in the proximity zone, proximity analytics module 374 may determine, based on the timestamp of an initial in_event and a current in_event, the dwell time the client device has been in the proximity zone. Alternatively, in response to not receiving a subsequent in_event within a particular duration of time, proximity analytics module 374 may determine that the client device is no longer in the proximity zone.

To determine the number of visits by a client device to a proximity zone, proximity analytics module 374 may include a counter to track each in_event to determine the number of visits by the client device to the proximity zone. In some examples, proximity analytics module 374 may use the counter to track each out event or other event to track a count of a particular event. In these and other examples, proximity analytics module 374 may output a result of the analysis to action module 375.

In this example, proximity assessment module 372 includes an action module 375 to invoke an action based on the one or more proximity events. As one example, action module 375 may, in response to receiving an event from proximity event module 373 or result from proximity analytics module 374, cause UI module 371 to generate data representative of a UI element (e.g., alert icon) within the UI that represents a notification to indicate whether a client device is within, still within, or no longer within the proximity zone for the AP device. In some examples, action module 375 may invoke a messaging module (not shown) to send a notification message to the client device that is within (or still within) the proximity zone or to an administrator monitoring the proximity zone. In some examples, action module 375 may cause UI module 371 to generate data representative of an occupant density UI map representing the density of client devices within the proximity zone. For example, proximity analytics module 374 may determine a count of all client devices within the proximity zone and provides the count of client devices to action module 375.

Action module 375 may cause UI module 371 to generate data representative of an occupant density UI map using the count of client devices to indicate different densities of client devices within the proximity zone. In some examples, the occupant density UI map includes one or more colors or any other characteristic (e.g., thickness, opaqueness, etc.) representing the count of client devices.

In some examples, action module 375 may cause radio resource manager 360 to make adjustments to the radio settings of the access points at each site to address identified issues. In other examples, action module 375 may control devices within the proximity zone (e.g., connecting to IoT terminal block to disable client device access to the wireless network, control other IoT devices, etc.), or any other action.

Although not illustrated in FIG. 3B, proximity zone engine 370 may include one or more APIs. The APIs may map proximity zones of AP devices to a site. In this way, if an AP device is moved to a different area in the site, the specifications (e.g., RSSI threshold value) for the proximity zone of the AP device are maintained and reused when establishing the proximity zone for the AP device at the new area.

Figure 4:
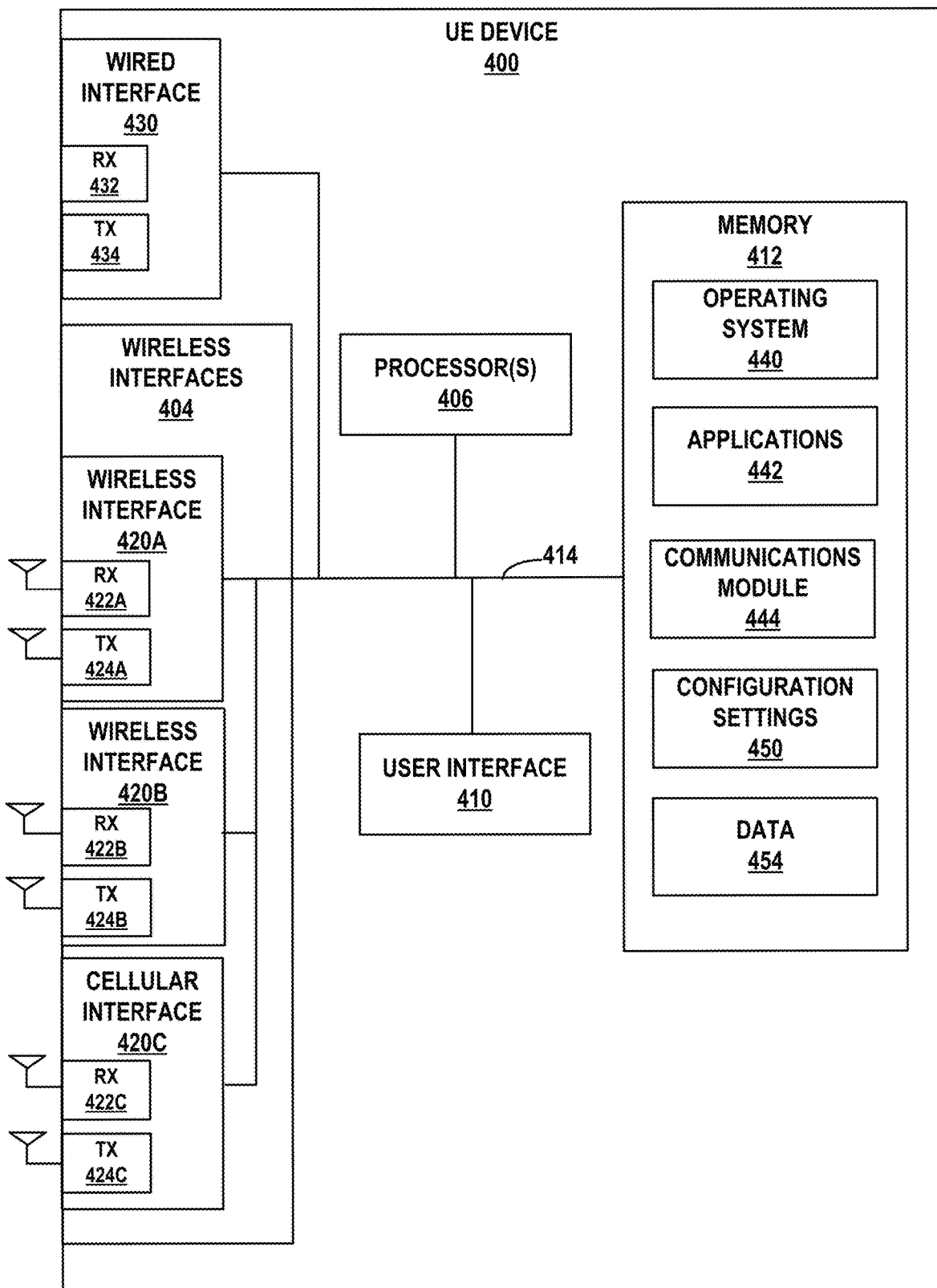
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, network data comprising proximity information (e.g., client identifier, AP identifier, RSSI measurements) may be stored in UE memory 412 as network data 454 and transmitted to NMS 130/300 via one or more AP devices 142 in the wireless network. For example, NMS 130 receives network data from UEs 148 in networks 106A-106N of FIG. 1A. In some examples, NMS 130 receives relevant network data from UEs 148 on a continuous basis (e.g., every 2 seconds or other appropriate time period), and NMS may determine proximity of each UE relevant to a proximity zone of an AP device to determine dwell time.

The network data 454 may include, for example, RSSI measurements of one or more wireless signals received from one or more AP devices by UE 400 as measured by the AP devices. The network data may further include a log of one or more UE associated events or states such as one or more proximity events (e.g., in_event, out event, etc.) received from NMS 130, and any other data or event relevant for determination of one or more proximity assessments.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by UE 400, such as network data used to determine proximity to a proximity zone, that is collected by UE 400 and transmitted to any of AP devices 138 in a wireless network 106 for further transmission to NMS 150.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
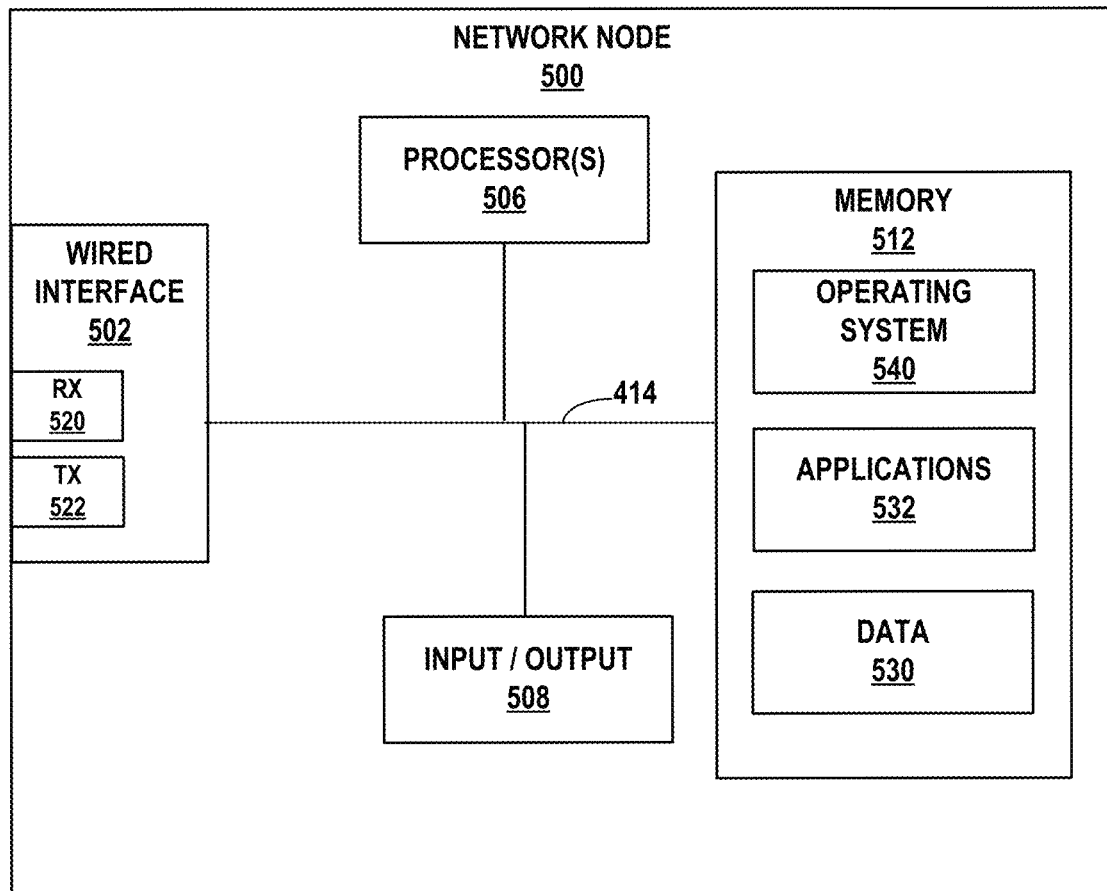
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server 110, DHCP server 116, DNS server 122, VNA 133, Web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6A:
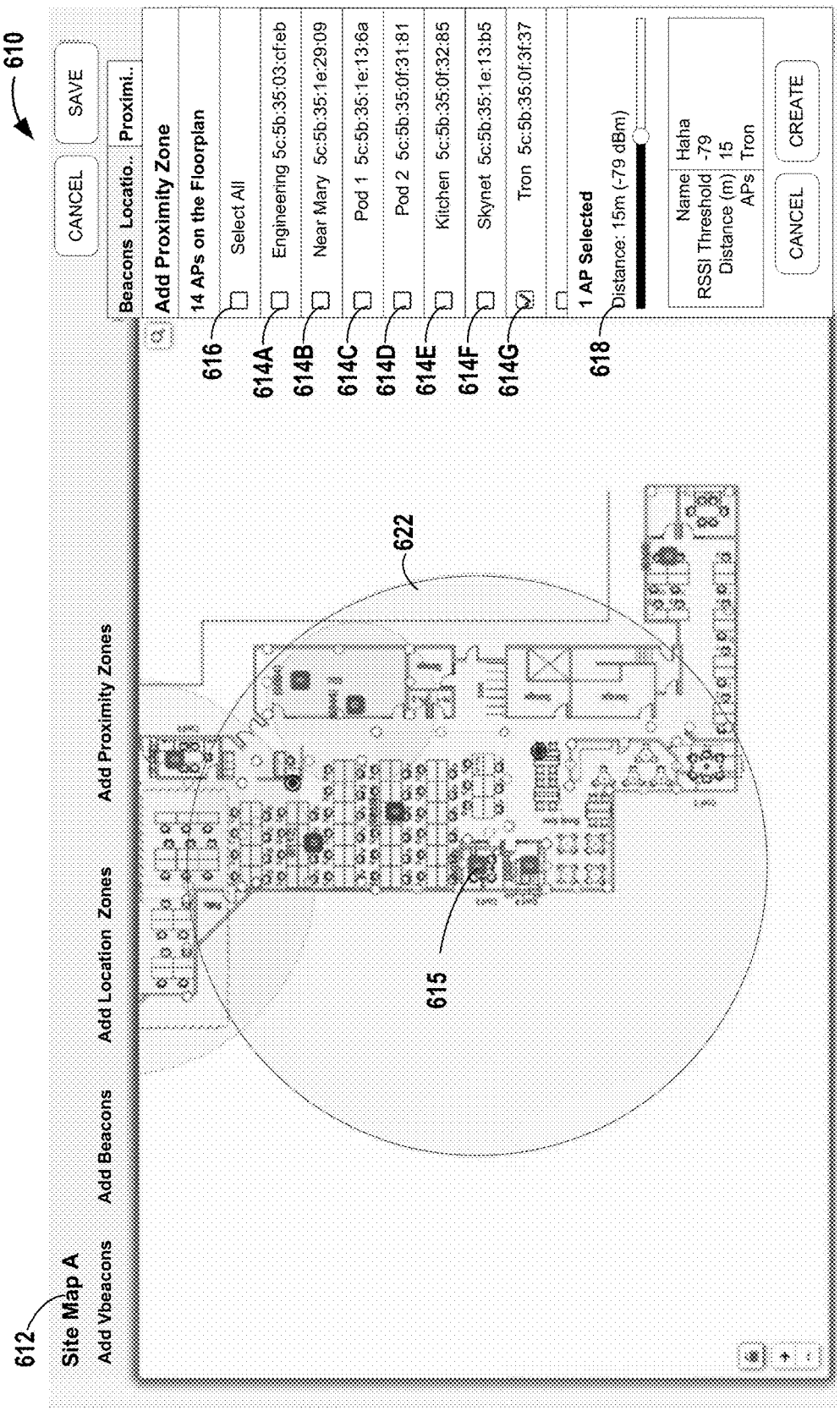
FIGS. 6A and 6B illustrate examples of a user interface by which a user may generate and manage proximity zones, in accordance with the techniques described in this disclosure.
Figure 6B:
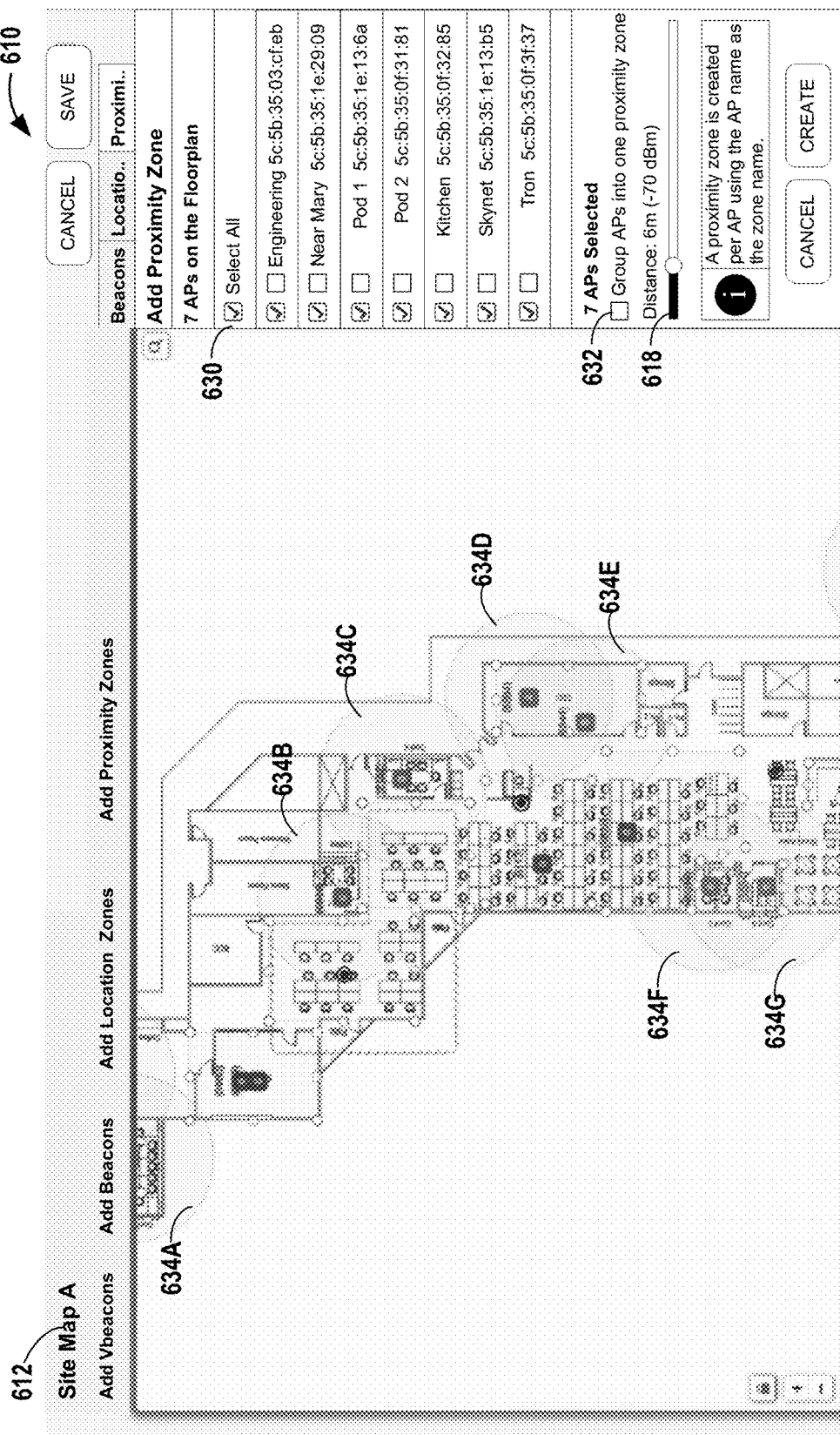

FIGS. 6A and 6B illustrate examples of a user interface by which a user may generate and manage proximity zones, in accordance with the techniques described in this disclosure. In the example of 6A, proximity zone engine 370 may generate (or cause a user interface module, e.g., UI module 371 of FIG. 3B to generate) data representative of a user interface 610 including user interface elements representing a mapping of a site and/or area of a site, e.g., site map A, (referred to herein as "site map 612") including one or more AP devices.

Proximity zone engine 370 generates data representative of a user interface 610 including selectable user interface elements for selecting which AP devices to generate a proximity zone. In some examples, proximity zone engine 370 generates data representative of a selectable list of AP devices including an option to select individual AP devices (e.g., selectable AP device user interface elements 614A-614G), and/or an option to select all AP devices (e.g., "Select All" user interface element 616), as further described in FIG. 6B.

In the example of FIG. 6A, a user may select the user interface element 614G to select AP device "Tron" to generate a proximity zone. Alternatively, a user may select a user interface element 615 (representing AP device "Tron") that is overlaid on site map 612 to select the AP device for which to generate a proximity zone.

In some examples, proximity zone engine 370 generates data representative of a user interface 610 including a user interface element to enable a user to specify an RSSI threshold value for a proximity zone. In this example, proximity zone engine 370 generates data representative of a slider UI element 618 to enable a user to specify the RSSI threshold value. Alternatively, or additionally, proximity zone engine 370 may generate data representative of an input field (not shown in FIG. 6A) to enable a user to specify an RSSI threshold value. In this example, a user may specify an RSSI threshold value of −79 dBm for the proximity zone generated for AP device "Tron". In some examples, proximity zone engine 370 may generate data representative of an input field to enable a user to specify a name or other identifier for the proximity zone (e.g., "Haha" in FIG. 6A), or may assign a default name to the proximity zone, such as the name of the AP device or other name.

In some examples, proximity zone engine 370 may generate data representative of a proximity zone UI element that represents the generated proximity zone overlaid on an AP device UI element. In this example, proximity zone engine 370 may generate data representative of proximity zone UI element 622 (e.g., a circle) overlaid on top of the AP device that represents the proximity zone "Haha" with an RSSI threshold value as −79 dBm. The distance of the proximity zone may correspond to the RSSI threshold value for the proximity zone. In this example, the distance of the proximity zone (e.g., 15 meters) corresponds with the RSSI threshold value of −79 dBm. Proximity zone engine 370 may generate data representative of the proximity zone UI element with a size representative of the specified RSSI threshold value.

FIG. 6B illustrates an example user interface by which a user may generate and manage proximity zones for all AP devices, in accordance with the techniques described in this disclosure.

In the example of FIG. 6B, a user may select the user interface element 630 to select all AP devices on the floorplan for which to generate one or more proximity zones. Although illustrated as generating data representative of a user interface element to enable a user to select all AP devices on the floorplan of site map 612, proximity zone engine 370 may generate data representative of a user interface element to enable a user to select all AP devices within an entire site for which to generate one or more proximity zones. Alternatively, a user may select all user interface elements representing the AP devices that are overlaid on site map 612 to select all AP devices for which to generate one or more proximity zones.

In this example, proximity zone engine 370 generates data representative of a slider UI element 618 to enable a user to specify the RSSI threshold value for each of the selected AP devices. In some examples, a user may use the slider UI element 618 to specify a single RSSI threshold value for all the selected AP devices (e.g., proximity zones that are uniform in size). In other examples, a user may use the slider UI element 618 to specify different RSSI threshold values for each of the selected AP devices (e.g., proximity zones that are non-uniform in size).

In some examples, proximity zone engine 370 generates data representative of user interface 610 including a grouping UI element 632 to enable a user to specify whether to group proximity zones of the selected AP devices into a single proximity zone. By selecting to group a plurality of AP devices, proximity zone engine 370 may monitor the proximity of client devices detected by any of the proximity zones among the group of AP devices with respect to a single proximity zone.

In this example, proximity zone engine 370 may generate data representative of proximity zone UI elements 634A-634G (collectively, "proximity zone UI elements 634") overlaid on top of the selected AP devices, respectively. In this example, each of the proximity zone UI elements 634 may represent a proximity zone with an RSSI threshold value as −70 dBm.

Figure 7:
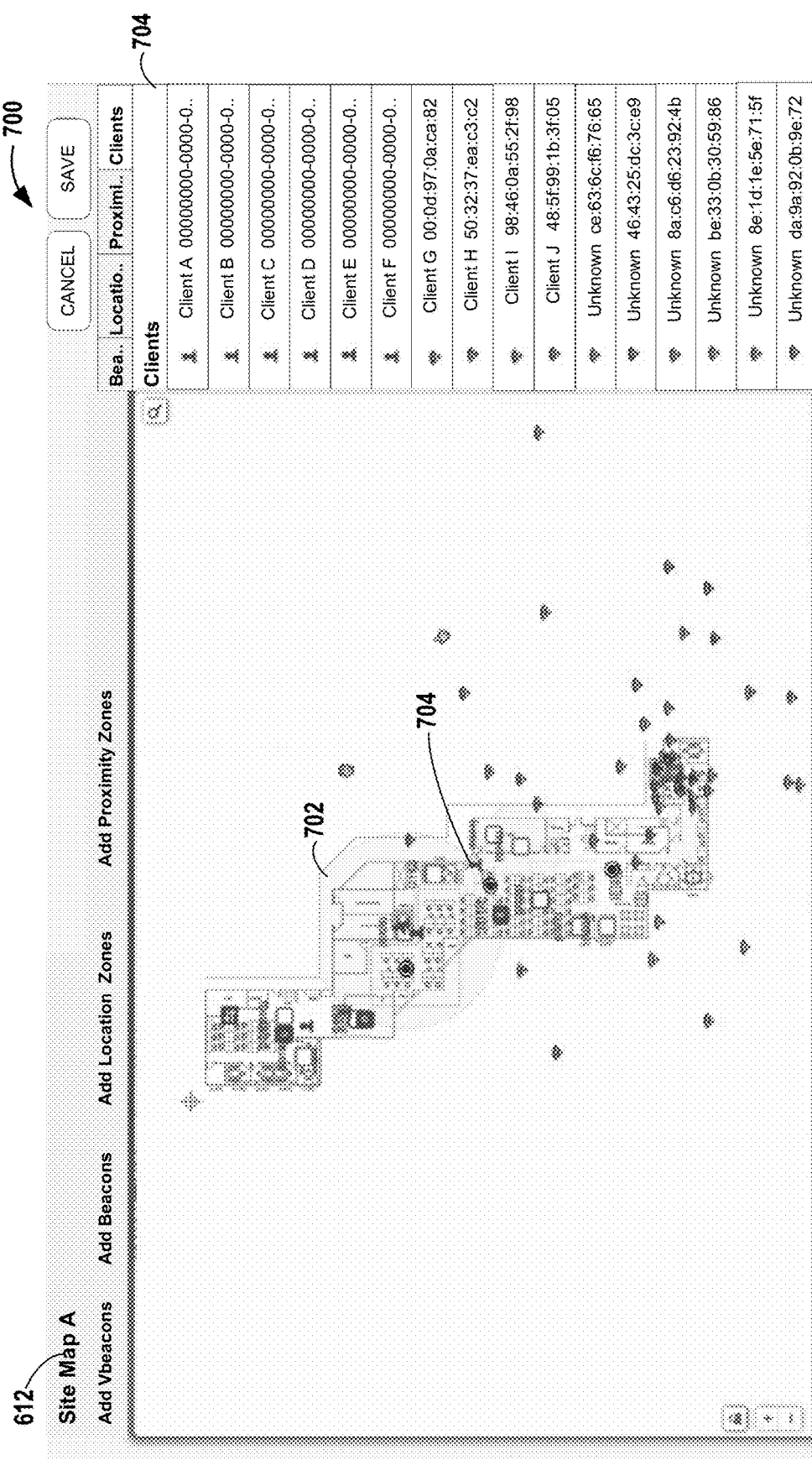
FIG. 7 illustrates an example user interface including user interface elements representing client devices detected by AP devices in relation to AP proximity zones, in accordance with the techniques described in this disclosure.

FIG. 7 illustrates an example user interface including user interface elements representing client devices detected by AP devices and detected by proximity zones, in accordance with the techniques described in this disclosure.

In the example of FIG. 7, proximity zone engine 370 may receive the network data of the detected client devices (e.g., client device ID, client device RSSI value, an AP device ID) and generate data representative of user interface 700 including user interface elements representing a mapping of a site and/or area of a site, e.g., site map A, (e.g., site map 612 of FIGS. 6A-6B) and the detected client devices. In this example, proximity zone engine 370 may generate data representative of a proximity zone UI element 702 representing a proximity zone generated for a particular AP device. Proximity zone engine 370 may generate data representative of client UI elements (e.g. client UI element 704) representing client devices or user equipment (e.g., client devices 148 of FIG. 1) detected by one or more AP devices and/or one or more proximity zones. The client UI elements may include a user interface element such as an icon, text, image, or other indicator representing a detected client device. Different client UI elements may be generated based on whether the detected client devices are within the proximity zone. In some examples, different client UI elements may be generated based on the type of client device and/or status of connection (e.g., connected WiFi client, unconnected WiFi client, BLE clients, etc.).

In some examples, proximity zone engine 370 may generate data representative of a list of detected client devices 704. The list of detected client devices may include a name of the client device, a client identifier, or any other information associated with the client device. In some examples, the list of detected client devices may include unknown client devices and their associated information.

Figure 8A:
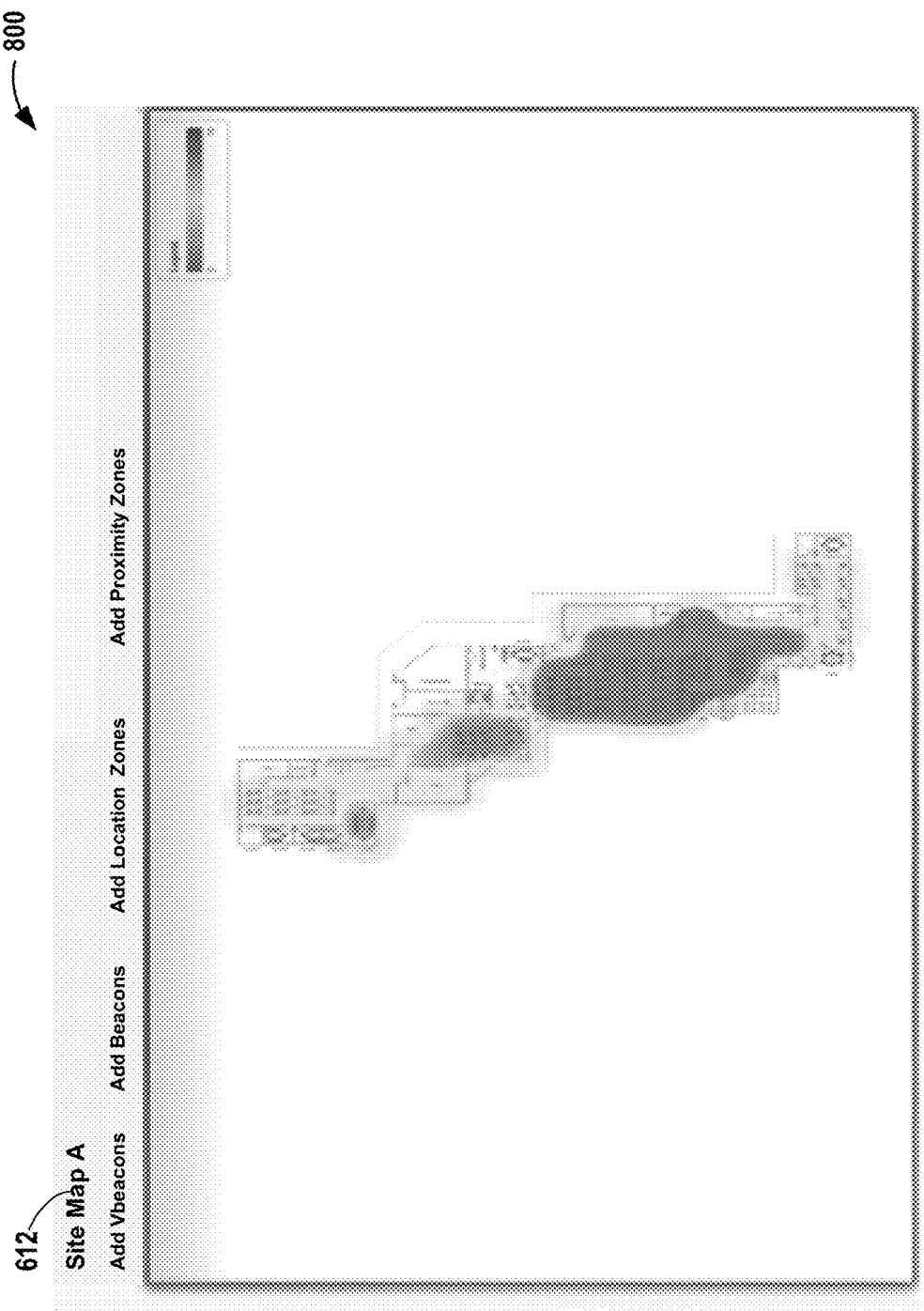

FIGS. 8A and 8B illustrate examples of user interfaces including user interface elements representing an analysis by the network management system, in accordance with the techniques described in this disclosure. FIG. 8A illustrates an example of a user interface including an occupant density UI map 800 representing the density of client devices within one or more proximity zones.

In this example, the occupant density UI map 800 may include a heat map, but may be any type of map to illustrate client device densities within proximity zones. In some examples, proximity analytics module 374 may determine a count of all client devices within the proximity zone and provides the count of client devices to action module 375. Action module 375 may cause UI module 371 to generate data representative of the occupant density UI map 800 using the count of client devices within proximity zones. The occupant density UI map 800 may include one or more colors or any other characteristic (e.g., thickness, opaqueness, etc.) to indicate different densities of client devices within the proximity zone.

FIG. 8B illustrates an example of a user interface representing a dwell time trend graph and client visit trend graph 810 (referred to herein as "dwell time and visit graph 810"). In this example, the dwell time and visit graph 810 may include a bar graph, but may be any type of graph or user interface to illustrate client device dwell time and visit counts within proximity zones. In some examples, proximity analytics module 374 may receive subsequent proximity information associated with a client device relative to an AP device. In some examples, the proximity information obtained from network data 316 may include a timestamp of when the proximity information was received by NMS 300. In some examples, proximity event module 373 may generate an event with a timestamp. Using the timestamps, proximity analytics module 374 may determine whether a client device is still in the proximity zone or is no longer in the proximity zone. For example, in response to receiving a subsequent in_event that indicates the client is still in the proximity zone, proximity analytics module 374 may determine, based on the timestamp of an initial in_event and a current in_event, the dwell time the client device has been in the proximity zone. Proximity analytics module 374 provides the dwell time of client devices to action module 375. Action module 375 may cause UI module 371 to generate data representative of the dwell time and visit graph 810 including one or more visual indicators (e.g., bars) to indicate the dwell time of client devices within the proximity zone.

Proximity analytics module 374 may include a counter to track each in_event to determine the number of visits by the client device to the proximity zone. In some examples, proximity analytics module 374 may use the counter to track each out event or other event to track a count of a particular event. In these and other examples, proximity analytics module 374 may output a result of the analysis to action module 375. Action module 375 may cause UI module 371 to generate data representative of the dwell time and visit graph 810 including one or more visual indicators (e.g., bars) to indicate the number of visits of client devices within the proximity zone. In some examples, dwell time and visit graph 810 may include one or more colors or any other characteristic (e.g., thickness, opaqueness, etc.) to indicate different types of visits of client devices within the proximity zone, such as new visits, repeat visits, etc.

Figure 9:
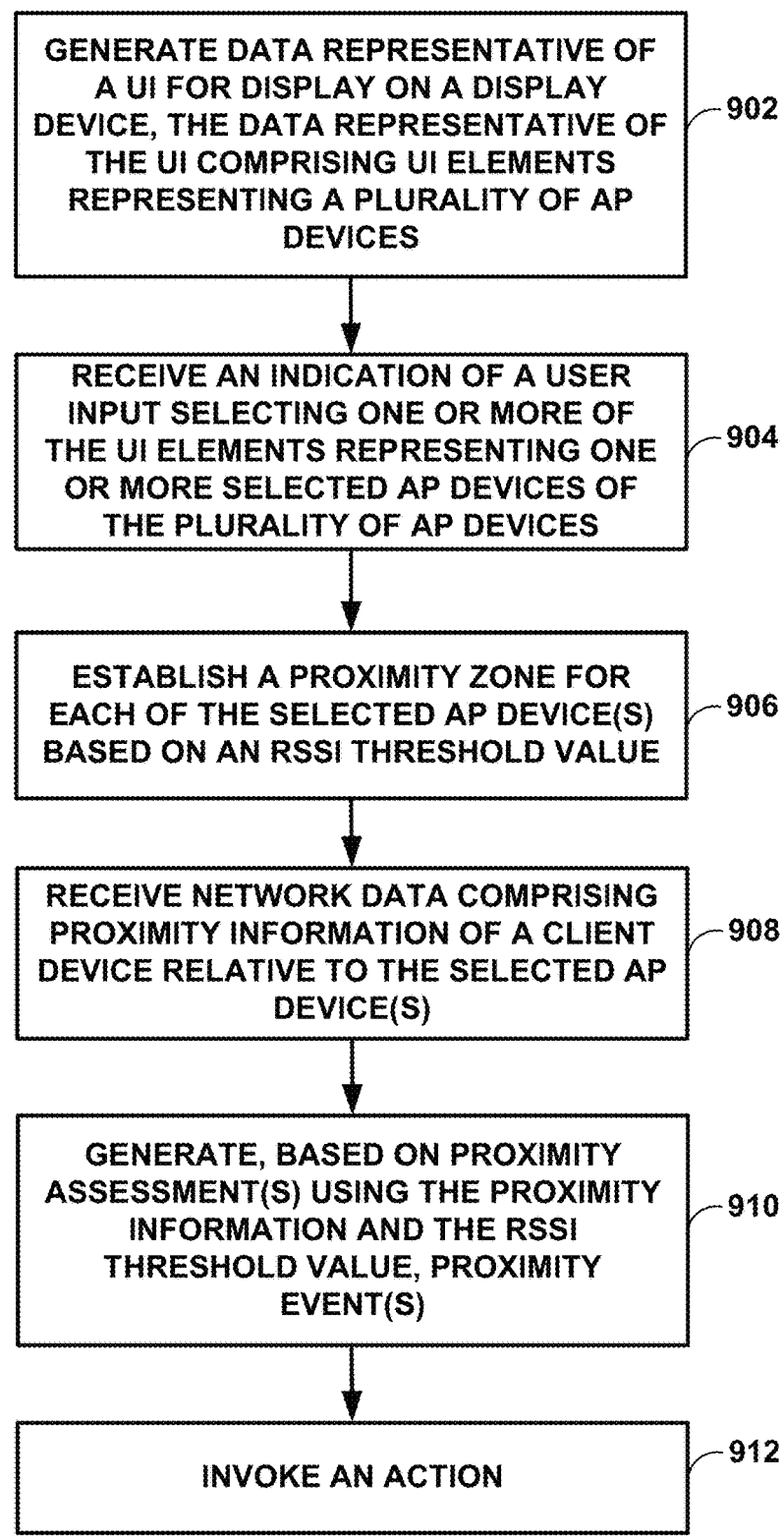
FIG. 9 is a flowchart of an example process by which a network management system provides a user interface to generate and monitor RSSI-based proximity zones in a wireless network, in accordance with one or more techniques of the disclosure.

FIG. 9 is a flowchart of an example process by which a network management system provides a user interface to generate and monitor RSSI-based proximity zones in a wireless network, in accordance with one or more techniques of the disclosure. FIG. 9 is described with respect to NMS 130 of FIG. 1 and proximity zone engine 370 of FIGS. 3A, 3B.

For example, NMS 130 may generate data representative of a user interface comprising user interface elements representing a plurality of access point devices configured to provide a wireless network at a site (902). For example, proximity zone engine 370 of NMS 130 may generate (or cause a user interface module, e.g., UI module 371 of FIG. 3B to generate) data representative of a user interface including user interface elements representing a mapping of a site and/or area of a site (e.g., site map 612 of FIG. 6A) including one or more AP devices. Proximity zone engine 370 generates data representative of a user interface including selectable user interface elements for selecting which AP devices to generate a proximity zone. In some examples, proximity zone engine 370 generates data representative of a selectable list of AP devices including an option to select individual AP devices (e.g., selectable AP device user interface elements 614A-614G of FIG. 6A), and/or an option to select all AP devices to select all AP devices (e.g., "Select All" user interface element 616 of FIG. 6B).

NMS 130 may receive, via the user interface on the display device, an indication of a user input selecting one or more AP devices (904). For example, a user may select, from a list of selectable user interface elements representing the AP devices, user interface element 614 to select one or more AP devices or select a "Select All" user interface element 616 to select all AP devices to generate a proximity zone. Alternatively, a user may select one or more user interface elements representing the AP devices that are overlaid on site map 612 for which to generate a proximity zone.

NMS 130 may establish a proximity zone for each of the selected AP devices based on a received signal strength indicator (RSSI) threshold value (906). For example, proximity zone engine 370 generates data representative of a user interface including a user interface element to enable a user to specify an RSSI threshold value for a proximity zone. In some examples, proximity zone engine 370 generates data representative of a slider UI element (e.g., slider UI element 618 of FIG. 6A) to enable a user to specify the RSSI threshold value. Alternatively, or additionally, proximity zone engine 370 may generate data representative of an input field to enable a user to specify an RSSI threshold value.

NMS 130 may monitor proximity zones established for the selected AP devices. For example, NMS 130 may receive, from at least one of the selected AP devices, network data comprising proximity information of a client device relative to the at least one of the selected AP device (908). For example, an AP device with an established proximity zone may detect a client device is within range of its wireless signal and sends network data including proximity information of the client device relative to the AP device. The proximity information may include, for example, an identifier of the client device, an identifier of the AP device, and an RSSI value of the client device.

NMS 130 may generate, based on one or more proximity assessments using the proximity information and the RSSI threshold value of the proximity zone, one or more proximity events (910). For example, proximity event module 373 may compute an inequality of an RSSI value of a client device (determined from the client identifier and RSSI value in the proximity information) with an RSSI threshold value of a proximity zone of an AP device (determined from the AP device identifier in the proximity information). In response to the result of the inequality, proximity event module 373 may generate a proximity event (e.g., in_event or out event) and output the proximity event to proximity analytics module 374 to analyze the one or more proximity events. For example, proximity analytics module 374 may determine the dwell time of a client device within a proximity zone, count the number of visits by a client device to a proximity zone, and/or the wait time of the client device. Proximity analytics module 374 may output a result of the analysis to action module 375 to invoke an action (912) such as generating a notification to indicate whether client device is within, still within, or no longer within a proximity zone for the AP device, generating data representative of occupant density UI map representing the density of client devices within the proximity zone, controlling devices within the proximity zone (e.g., disabling client device access to the wireless network, controlling other IoT devices, etc.), or any other action. In some examples, the proximity event module 373 may send the one or more proximity events directly to action module 375 to invoke an action (e.g., send a notification message).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology-Telecommunications and information exchange between systems Local and metropolitan area networks-Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 4: Enhancements for Very High Throughput for Operation in Bands below 6 GHz", December, 2013); IEEE 802.11 ad ("IEEE P802.11 ad-2012, IEEE Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 3: Enhancements for Very High Throughput in the 60 GHz Band", 28 December, 2012); IEEE-802.11REVmc ("IEEE 802.11-REVmc™/D3.0, June 2014 draft standard for Information technology-Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications-Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation (s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm®

Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA.RTM. or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A network management system comprising:
 one or more processors; and
 a memory comprising instructions that when executed by the one or more processors cause the one or more processors to:
 generate data representative of a user interface (UI) for display on a display device, the data representative of the UI comprising UI elements overlaid on a site map, wherein the UI elements represent a plurality of access point (AP) devices configured to provide a wireless network at a site corresponding to the site map;
 receive, via the user interface on the display device, an indication of a user input selecting one or more of the UI elements overlaid on the site map, wherein the selected one or more UI elements represent selected AP devices of the plurality of AP devices at the site;
 receive, via the user interface on the display device, an indication of a user input specifying a received signal strength indicator (RSSI) threshold value for each of the selected AP devices;
 establish, based on the user input selecting the one or more UI elements representing the selected AP devices overlaid on the site map and the user input specifying the RSSI threshold value for each of the selected AP devices, a proximity zone for each of the selected AP devices;
 generate data representative of a proximity zone UI element representing the proximity zone for each of the selected AP devices;
 receive, from an AP device of the selected AP devices, network data comprising proximity information of a client device relative to the AP device;
 generate, based on one or more proximity assessments using the proximity information and the RSSI threshold value of a corresponding proximity zone for the AP device, one or more proximity events indicating the client device relation to the corresponding proximity zone; and
 invoke, based on the one or more proximity events, one or more actions, wherein the one or more actions comprise generating data representative of one or more UI elements overlaid on the site map representing the client device in relation to the corresponding proximity zone.

2. The system of claim 1, wherein to generate the data representative of the UI, the one or more processors are further configured to:
 generate data representative of an RSSI threshold value UI element representing a selectable range of RSSI threshold values to control sizing of the proximity zone.

3. The system of claim 1, wherein the one or more proximity events comprises at least one of an event indicating that the client device is within the corresponding proximity zone, an event indicating that the client device is not within the corresponding proximity zone, an event indicting that the client device has entered the corresponding proximity zone, or an event indicating that the client device has exited the corresponding proximity zone.

4. The system of claim 1, wherein to generate, based on one or more proximity assessments using the proximity information and the RSSI threshold value of the corresponding proximity zone for the AP device, one or more proximity events indicating the client device relation to the corresponding proximity zone, the one or more processors are configured to:

compute an inequality of an RSSI value of the proximity information of the client device with the RSSI threshold value of the corresponding proximity zone for the AP device; and generate, based on a result of the inequality, the one or more proximity events.

5. The system of claim 4, wherein to generate, based on the result of the inequality, the one or more proximity events, the one or more processors are further configured to:

in response to the result of the inequality being the RSSI value of the client device is less than the RSSI threshold value of the corresponding proximity zone, generate an event indicating that the client device is not within the corresponding proximity zone.

6. The system of claim 4, wherein to generate, based on the result of the inequality, the one or more proximity events, the one or more processors are further configured to:

in response to the result of the inequality being the RSSI value of the client device is greater than the RSSI threshold value of the corresponding proximity zone, generate an event indicating that the client device is within the corresponding proximity zone.

7. The system of claim 4, wherein to generate, based on the result of the inequality, the one or more proximity events, the one or more processors are further configured to:

in response to not receiving an updated RSSI value of the client device after a given duration of time, generate an event indicating that the client device is no longer within the corresponding proximity zone.

8. The system of claim 1, further comprising:

receive, via the user interface on the display device, an indication of a user input to group the selected AP devices;

wherein to establish the proximity zone for each of the selected AP devices based on the RSSI threshold value, the one or more processors are further configured to establish a single proximity zone for the group of the selected AP devices.

9. The system of claim 1, wherein to invoke, based on the one or more proximity events, one or more actions, the one or more processors are further configured to perform at least one of:

send one or more notification messages to the client device;

generate data representative of an occupant density UI map representing a density of client devices within the corresponding proximity zone; or generate data representative of a visit count UI representing a number of visits of the client device within the corresponding proximity zone.

10. A method comprising:

generating, by one or more processors of a network management system, data representative of a user interface (UI) for display on a display device, the data representative of the UI comprising UI elements overlaid on a site map, wherein the UI elements represent a plurality of access point (AP) devices configured to provide a wireless network at a site corresponding to the site map;

receiving, via the user interface on the display device, an indication of a user input selecting one or more of the UI elements overlaid on the site map, wherein the selected one or more UI elements represent selected AP devices of the plurality of AP devices at the site;

receiving, by the network management system and via the user interface on the display device, an indication of a user input specifying a received signal strength indicator (RSSI) threshold value for each of the selected AP devices, and establishing, based on the user input selecting the one or more UI elements representing the selected AP devices overlaid on the site map and the user input specifying the RSSI threshold value for each of the selected AP devices and by the network management system, a proximity zone for each of the selected AP devices;

generating, by the network management system, data representative of a proximity zone UI element representing the proximity zone for each of the selected AP devices;

receiving, by the network management system and from an AP device of the selected AP devices, network data comprising proximity information of a client device relative to the AP device;

generating, by the network management system and based on one or more proximity assessments using the proximity information and the RSSI threshold value of a corresponding proximity zone for the AP device, one or more proximity events indicating the client device relation to the corresponding proximity zone; and invoking, by the network management system and based on the one or more proximity events, one or more actions, wherein the one or more actions comprise generating data representative of one or more UI elements overlaid on the site map representing the client device in relation to the corresponding proximity zone.

11. The method of claim 10, wherein generating the data representative of the UI comprises:

generating data representative of an RSSI threshold value UI element representing a selectable range of RSSI threshold values to control sizing of the proximity zone.

12. The method of claim 10, wherein generating the one or more proximity events comprises generating at least one of an event indicating that the client device is within the corresponding proximity zone, an event indicating that the client device is not within the corresponding proximity zone, an event indicating that the client device has entered the corresponding proximity zone, or an event indicating that the client device has exited the corresponding proximity zone.

13. The method of claim 10, wherein generating, based on one or more proximity assessments using the proximity information and the RSSI threshold value of the corresponding proximity zone for the AP device, one or more proximity events indicating the client device relation to the corresponding proximity zone, comprises:

computing an inequality of an RSSI value of the proximity information of the client device with the RSSI threshold value of the corresponding proximity zone for the AP device; and generating, based on a result of the inequality, the one or more proximity events.

14. The method of claim 13, wherein generating, based on the result of the inequality, the one or more proximity events comprises:

in response to the result of the inequality being the RSSI value of the client device is less than the RSSI threshold value of the corresponding proximity zone, generating an event indicating that the client device is not within the corresponding proximity zone.

15. The method of claim 13, wherein generating, based on the result of the inequality, the one or more proximity events comprises:

in response to the result of the inequality being the RSSI value of the client device is greater than the RSSI threshold value of the corresponding proximity zone, generating an event indicating that the client device is within the corresponding proximity zone.

16. The method of claim 13, wherein generating, based on the result of the inequality, the one or more proximity events comprises:
in response to not receiving an updated RSSI value of the client device after a given duration of time, generating an event indicating that the client device is no longer within the corresponding proximity zone.

17. The method of claim 10, further comprising:
receiving, via the user interface on the display device, an indication of a user input to group the selected AP devices;
wherein establishing the proximity zone for each of the selected AP devices based on the RSSI threshold value comprises establishing a single proximity zone for the group of the selected AP devices.

18. Non-transitory computer-readable storage media comprising instructions that, when executed, configure processing circuitry to:
generate data representative of a user interface (UI) for display on a display device, the data representative of the UI comprising UI elements overlaid on a site map, wherein the UI elements represent a plurality of access point (AP) devices configured to provide a wireless network at a site corresponding to the site map;
receive, via the user interface on the display device, an indication of a user input selecting one or more of the UI elements overlaid on the site map, wherein the selected one or more UI elements represent selected AP devices of the plurality of AP devices at the site;
receive, via the user interface on the display device, an indication of a user input specifying a received signal strength indicator (RSSI) threshold value for each of the selected AP devices;
establish, based on the user input selecting the one or more UI elements representing the selected AP devices overlaid on the site map and the user input specifying the RSSI threshold value for each of the selected AP devices, a proximity zone for each of the selected AP devices;
generate data representative of a proximity zone UI element representing the proximity zone for each of the selected AP devices;
receive, from an AP device of the selected AP devices, network data comprising proximity information of a client device relative to the AP device;
generate, based on one or more proximity assessments using the proximity information and the RSSI threshold value of a corresponding proximity zone for the AP device, one or more proximity events indicating the client device relation to the corresponding proximity zone; and
invoke, based on the one or more proximity events, one or more actions, wherein the one or more actions comprise generating data representative of one or more UI elements overlaid on the site map representing the client device in relation to the corresponding proximity zone.

* * * * *